Aug. 13, 1935.  F. SAMUELSON  2,011,420

GAS TURBINE POWER PLANT

Filed June 14, 1933  2 Sheets-Sheet 1

Inventor:
Frederick Samuelson.
by Chas. E. Tullar
His Attorney.

Aug. 13, 1935.  F. SAMUELSON  2,011,420
GAS TURBINE POWER PLANT
Filed June 14, 1933   2 Sheets-Sheet 2

Inventor:
Frederick Samuelson.
by Charles E. Mullan
His Attorney.

Patented Aug. 13, 1935

2,011,420

UNITED STATES PATENT OFFICE 2,011,420

GAS TURBINE POWER PLANT

Frederick Samuelson, Rugby, England, assignor to General Electric Company, a corporation of New York Application June 14, 1933, Serial No. 675,778
In Great Britain January 6, 1933

9 Claims. (Cl. 60—43)

The present invention relates to gas turbine powers plants in which air is supplied to a furnace and the furnace gases are mixed with additional air and the mixture conducted to a high pressure turbine.

One object of my invention is to provide an improved construction and arrangement of such power plants in which the gases exhausted from a high pressure turbine are conducted to a low pressure turbine whereby the condition of the gases supplied to the last named turbine may be effectively controlled and the total efficiency of the plant thereby substantially improved.

For a consideration of what I believe to be novel and my invention, attention is directed to the following description and the claims appended thereto in connection with the accompanying drawings.

Figures 1, 2:
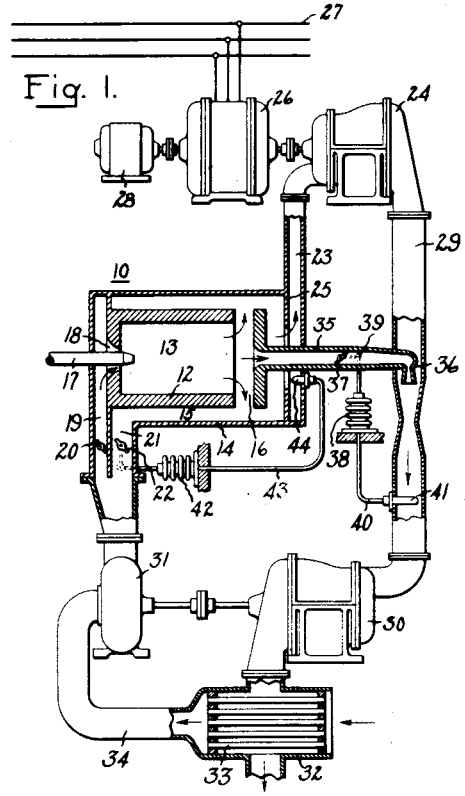
Figure 3:
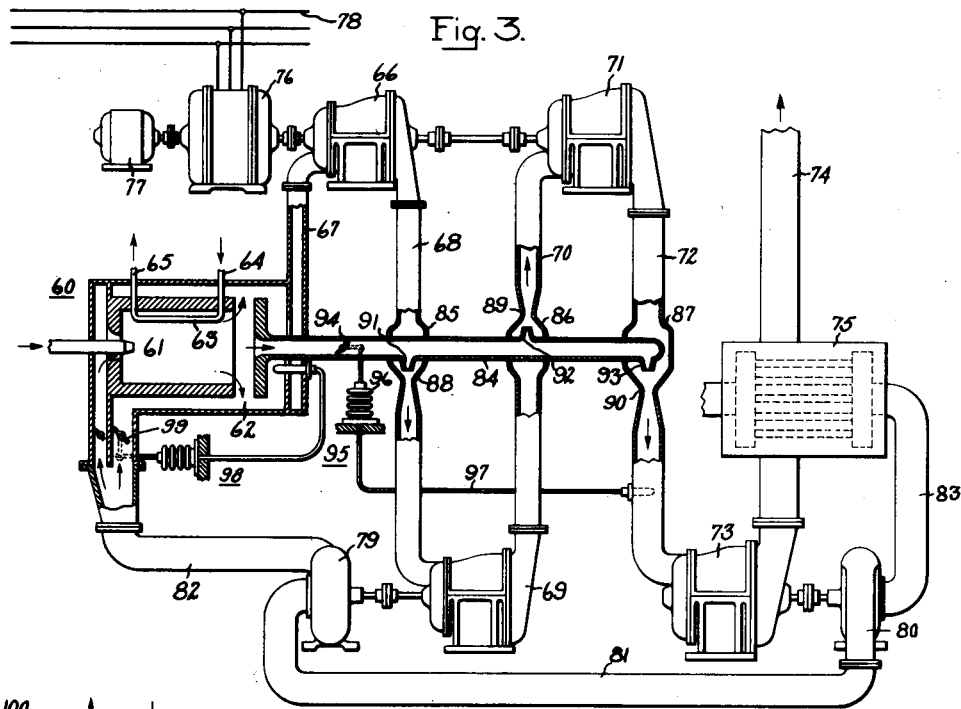
Figure 4:
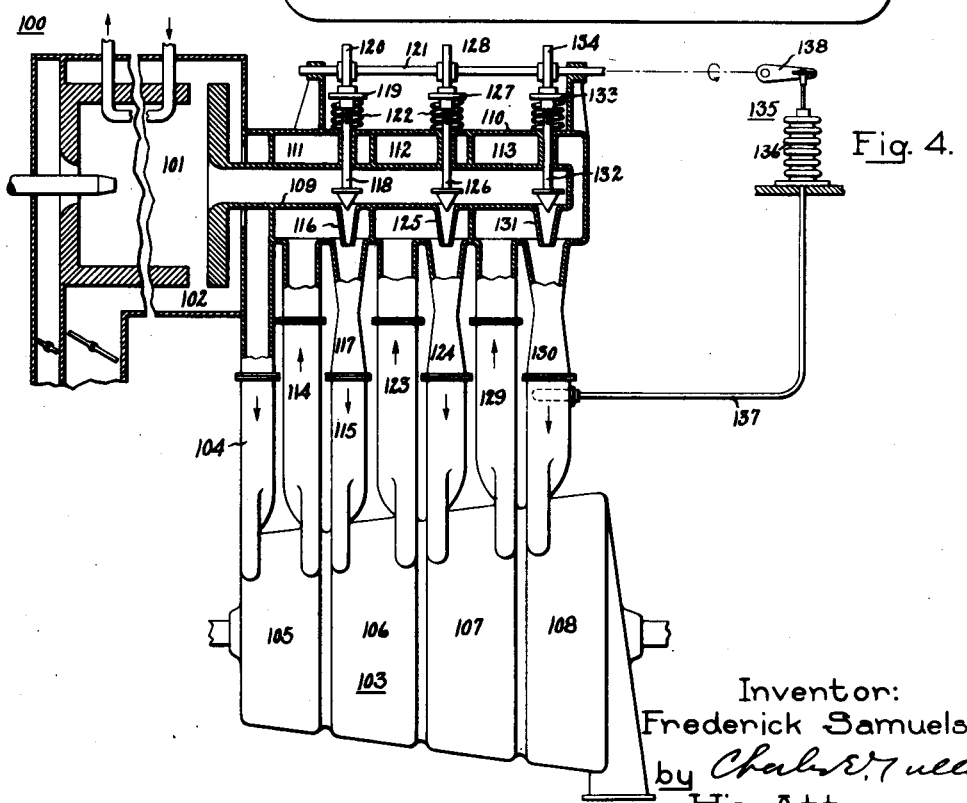

In the drawings, Fig. 1 represents a diagrammatic illustration of a power plant embodying my invention; Fig. 2 shows a modification of a part of Fig. 1; and Figs. 3 and 4 illustrate modifications of a power plant in accordance with my invention.

The arrangement shown in Fig. 1 comprises a furnace 10 having an inner wall 12 of cylindrical shape defining a combustion chamber or space 13. A jacket or outer wall 14 is concentrically arranged with the inner wall 12 to define an annular space 15 communicating at the right-hand end through an opening or openings 16 with the combustion space. Combustible material is supplied to the combustion space by a burner 17 projecting through a hole 18 in the bottom portion of the cylindrical member 12. Air for maintaining the combustion in the combustion space is conducted through a conduit 19 including a valve 20 for controlling the flow of air through the annular opening defined by hole 18 and the burner 17. A conduit 21 connected to the jacket 14 serves to conduct air into the space 15. The flow of air to this space is controlled by a valve 22 in the conduit 21.

During operation a portion of the combustion gases flows through the openings 16 and is mixed with the air in the space 15, the mixture being conducted through a conduit 23 to the inlet of a high pressure turbine 24. To secure a thorough mixing of the combustion gases and the air in the space 15 I provide baffle plates 25 near the right-hand end of the space 15.

The high pressure turbine 24 has been shown in the present instance as driving an alternator 26 connected to an electric line 27. An exciter 28 for the alternator is coupled with the latter.

Connected to the exhaust of the gas turbine 24 is one end of a cross-over conduit 29 which has its other end connected to the inlet of another turbine 30. This arrangement permits the conversion of available energy of the exhaust gases into mechanical energy by the low pressure turbine 30. The mechanical load output of the latter is in the present instance utilized for driving a compressor or blower 31 coupled to the turbine and supplying air to the furnace 10. The exhaust of the turbine 30 is connected to a heat exchanger 32 comprising a plurality of tubes 33 through which air is conducted and discharged into the suction conduit 34 of the compressor or blower 31.

An important feature of my invention is the provision of means for reheating the exhaust gases discharged from the high pressure turbine 24 to obtain the desired temperature of these gases in the inlet to the turbine 30. These means comprise a conduit 35 for conducting combustion gases from the combustion space 13 into the cross-over conduit 29. The combustion gases are mixed within the conduit 29 with the exhaust gases of turbine 24 and the mixture is supplied to the low pressure turbine. The pressure within the combustion space 13 is higher than the exhaust pressure of turbine 24. The pressure difference is utilized in accordance with my invention to accelerate the velocity of the exhaust gases within the conduit 29. This is accomplished by the provision of a nozzle 36 at the end of the conduit 35, which nozzle discharges in the direction of flow of the exhaust. The higher pressure of the combustion gases conducted through conduit 35 is partly converted into velocity energy within the nozzle 36. The velocity energy is afterwards converted into pressure energy to increase the pressure ahead of the inlet of the low pressure turbine.

The flow of gases within the conduit 35 is controlled by a valve 37 which is regulated in response to a condition of the gases flowing into the turbine 30. In the present instance I have shown a device for operating the valve 37 in response to temperature changes in the conduit 29. This device comprises a bellows 38 having its upper end connected to the valve 37 by means of a link 39. The lower end of the bellows is provided with a conduit 40 having a sealed end portion 41 projecting into the conduit 29. The sealed space defined within the conduit and the bellows contains a fluid, for instance, air. As the temperature within conduit 29 increases, the fluid contained in the end portion 41 of the conduit 40 expands, to the effect that the pressure within the conduit and the bellows increases and causes expansion of the bellows and accordingly upward movement of the upper end of the bellows, turning the valve 37 in closing direction. This is a known kind of temperature-responsive device for operating a valve in response to temperature changes. A similar arrangement is provided with respect to valve 22 in the conduit 21 to regulate the flow of air into the space 15 in response to temperature changes of the mixture of air and combustion gases. This device comprises a bellows 42 having one end connected to valve 22 and another end connected to a conduit 43 provided with a sealed end 44 projecting into the mixing chamber 15 near the conduit 23. An increase of temperature of the gas-air mixture causes fluid contained within conduit 43 and the bellows to expand, resulting in expansion of the bellows and opening movement of the valve 22. This permits an increased flow of air to the mixing space or chamber 15, resulting in a decrease in temperature of the gas-air mixture discharged into the high pressure turbine.

Fig. 2 shows a modification of the cross-over conduit for conducting gases from the high pressure to the low pressure turbine and the conduit for ejecting gases from the combustion chamber into the cross-over conduit. A cross-over conduit 50 has its lower end connected to the inlet conduit 51 of a low pressure turbine. A conduit 52 corresponding to the conduit 35 of Fig. 1 has an end projecting into the cross-over conduit 50 and provided with a nozzle defining an ejector 53 for discharging combustion gases from the combustion chamber in the direction of flow of exhaust gases within the cross-over conduit 50. Whereas I have shown in Fig. 1 a butterfly valve 37 for dampening the flow of combustion gases, I provide in accordance with the modification of Fig. 2 a needle valve 54 for regulating the discharge of combustion gases from the ejector 53. This arrangement serves for utilizing the difference in pressure between the combustion chamber and the high-pressure turbine out't. The velocity of the gases discharged from the combustion chamber into the cross-over conduit is increased by the restriction formed by the nozzle ejector 53. The high velocity of the gases is afterwards converted into pressure energy as the gases leave the nozzle 53. The low-pressure turbine will thus operate with an inlet pressure somewhat above the high-pressure turbine outlet pressure. At the same time a homogeneous temperature gas mixture is obtained ahead of the inlet of the low-pressure turbine.

The arrangement shown in Fig. 3 comprises a furnace 60 corresponding to the furnace 10 in Fig. 1 forming a combustion chamber 61 and a mixing space or chamber 62, and including means for utilizing a part of the heat energy in the combustion chamber to produce steam or like elastic fluid. This means has been diagrammatically indicated as a container for fluid 63 along the inner surface of the combustion chamber 61 having an inlet conduit 64 for receiving liquid to be evaporated and an outlet conduit 65 for discharging the fluid heated and partly evaporated in the container 63. A gas turbine 66 has an inlet conduit 67 connected to the mixing chamber 62 for receiving a gas-air mixture from the furnace. The available energy of this gas-air mixture is partly transformed into mechanical energy within the turbine and the exhaust is conducted by means of a cross-over conduit 68 to the inlet of another turbine 69 which has its exhaust conduit connected by means of another cross-over conduit 70 to the inlet of a third gas turbine 71. The latter discharges the exhaust gases into a cross-over conduit 72 connected to the inlet of a fourth gas turbine 73 from which the exhaust is discharged into a flue 74 through the intermediary of a heat exchanger 75. Thus the four turbines 66, 69, 71 and 73 are connected in series as regards the flow of the gas-air mixture from the mixing chamber 62 therethrough. The turbines 66 and 71 are mechanically coupled and serve for driving an alternator 76 and an exciter 77. The alternator 76 is connected to an electric line 78. Each of the gas turbines 69 and 73 is coupled with a blower or compressor 79 and 80 respectively for supplying the necessary amount of air to the furnace. In the present instance I have shown the two compressors or blowers as being connected in series. The discharge conduit of compressor 80 is connected by means of a conduit 81 to the inlet of the compressor 79, the latter having its discharge conduit 82 connected to the furnace. The suction conduit 83 of compressor 80 is connected to the heat exchanger or air preheater 75 and receives preheated air therefrom.

In order to reheat the exhaust gases supplied from one turbine to the succeeding turbine in the above mentioned series of turbines I provide means for directly conducting combustion gases from the combustion chamber 61 into each of the cross-over conduits 68, 70 and 72. These means have been indicated in the present instance as comprising a conduit 84 having its left-hand end connected to the combustion chamber 61. The conduit 84 projects through enlarged portions 85, 86 and 87 of the cross-over conduits 68, 70 and 72 respectively. Each of these enlarged portions has a nozzle-like restriction 88, 89 and 90 respectively. The portions of the conduit 84 within the enlarged portions of the cross-over conduits have openings 91, 92 and 93 respectively for ejecting combustion gases into the cross-over conduits. The ejection of combustion gases in each of the cross-over conduits takes place in the direction of the flow of the exhaust gases within said conduits. The combustion gases are ejected ahead of the nozzle-like restrictions 88, 89 and 90 respectively. The flow of combustion gases through conduit 84 is controlled in response to a condition of the gas mixtures in one of the cross-over conduits. In the present instance I have provided a damper in the form of a butterfly valve 94 near the inlet of conduit 84 controlled by a temperature responsive device 95 corresponding to the temperature responsive device 38, 40 of Fig. 1 and comprising a bellows 96, and a conduit 97 connected to the bellows having a sealed end projecting into the cross-over conduit 72. The upper end of the bellows is connected to the damper 94. During operation an increase in temperature within the conduit 72 causes the gases in conduit 97 and the bellows 96 to expand, effecting expansion of the bellows 96, resulting in closing movement of the damper 94. The flow of gases within conduit 84 thereby decreases, effecting a decrease in temperature of the mixtures within the cross-over conduits. The temperature of the gas-air mixture supplied to the high pressure turbine 66 is controlled by a device 98, corresponding to the device 42—44 of Fig. 1, for positioning a valve 99 in the inlet of the mixing chamber 62.

Whereas I have shown in Fig. 3 an arrangement comprising a plurality of separate turbines and means for conducting combustion gases from the combustion chamber to the cross-over conduits between said turbines, which means are controlled in response to the temperature of the gases in one of the cross-over conduits, I have shown in the arrangement of Fig. 4 a single turbine provided with means for reheating the gases between successive stages of the turbine by directly supplying combustion gases from a combustion chamber to each of the lower stages of said turbine. The arrangement comprises a furnace 100 corresponding to the furnace 60 shown in Fig. 3 and having a combustion chamber 101 and a mixing chamber 102. A gas turbine 103 has an inlet conduit 104 receiving a gas-air mixture from the mixing chamber 102. The turbine 103 has four successive stages 105, 106, 107 and 108. The means for reheating the gases flowing from higher stages to lower stages comprise a conduit 109 connected to the combustion chamber 101. Concentrically arranged with this conduit is an outer conduit 110. The annular space defined between the conduits 109 and 110 is separated by webs or partitions to form annular chambers 111, 112 and 113. The first of these annular chambers 111 receives gases from the outlet of the first turbine stage 105 through a conduit 114 and discharges gases to the inlet side of the second stage 106 through a conduit 115 connected to the first annular chamber. The conduit 109 is provided with an opening 116 for conducting combustion gases into the inlet of the conduit 115 ahead of a nozzle-like restriction 117 of the latter. The flow of combustion gases through opening 116 of conduit 109 is controlled by a needle valve 118 having a stem projecting through the inner and outer conduits 109 and 110. Screw-threaded to the outer end of the stem is a sleeve 119 engaging a cam 120 fixed on a shaft 121. The valve stem with the sleeve is biased in opening direction by means of a spring 122 to maintain engagement with the cam 120. This arrangement permits positioning of the valve 118 either by turning the sleeve 119 on the stem or by turning the cam 120.

The arrangements for reheating the gases between the second and third and between the third and fourth stages of the turbine are similar to the arrangement for reheating the gases between the first and the second stage. The arrangement between the second and the third stage comprises a conduit 123 for conducting at least a part of the gases from the outlet side of the stage 106 into the annular chamber 112 and a conduit 124 for conducting gases into the inlet side of the stage 107. Provided ahead of the inlet of the conduit 124 is an opening 125 through which combustion gases are conducted from the inner conduit 109 into the conduit 124. The flow of these gases is controlled by a valve 126 regulated by a sleeve 127 and by a cam 128. The arrangement between the third and fourth stage comprises conduits 129 and 130 connected to the annular chamber 113. An opening 131 of the inner conduit 109 admits the supply of combustion gases into the inlet of conduit 130. The flow of these gases is controlled by a needle valve 132 corresponding to valves 118 and 126. The valve 132 is positioned by a sleeve 133 and by a cam 134. The three cams 120, 128 and 134 are fixed to the shaft 121. Turning of this shaft permits the collective and simultaneous control of the flow of combustion gases into each of the lower stages 106, 107 and 108. In the present instance I have shown means for automatically turning the cams, that is, positioning the valves and controlling the flow of combustion gases in response to temperature changes in the conduit 130 ahead of the inlet of the last stage 108. These means comprise a temperature responsive device 135 having a bellows 136 and a conduit 137 with a sealed end projecting into the conduit 130. The upper end of the bellows 136 is connected to a link 138 fastened to the shaft 121.

During operation an increase in temperature within conduit 130 causes expansion of a gas in conduit 137 and the bellows 136, to the effect that the bellows expands and moves the cam shaft 121 in a direction to effect a closing movement of the needle valves 118, 126 and 132. The flow of combustion gases from the combustion chamber 101 into each of the lower stages thereby decreases, resulting in a lower temperature in conduit 130 ahead of the last stage. The sleeves 119, 127 and 133 permit individual control of the flow of combustion gases into each of the lower stages. Preferably I adjust the valves 118, 126 and 132 by means of the sleeves 119, 127 and 133 respectively to obtain the desired temperature to the gas mixtures in conduits 115, 124 and 130 under normal operating conditions. The temperature conditions are thereafter maintained automatically through the positioning of the cam shaft 121 by the temperature responsive device 135.

Having described the method of operation of my invention, together with the apparatus which I now consider to represent the best embodiment thereof, I desire to have it understood that the apparatus shown is only illustrative and that the invention may be carried out by other means.

What I claim as new and desire to secure by Letters Patent of the United States is:

1. In a gas turbine power plant, the combination of a furnace comprising a combustion chamber and a mixing chamber receiving gases from the combustion chamber, means for supplying air to said chambers, a plurality of gas turbines, one of said turbines having an inlet connected to the mixing chamber, a cross-over conduit connected to the exhaust of the last named turbine, another of said turbines having an inlet connected to said conduit for receiving exhaust from the first named turbine, and means for conducting gases from the combustion chamber into said conduit to reheat the exhaust gases of the first named turbine.

2. In a gas turbine power plant, the combination of a furnace comprising a combustion chamber and a mixing chamber receiving gases from the combustion chamber, means for supplying air to said chambers, a plurality of gas turbines, one of said turbines having an inlet connected to the mixing chamber, a cross-over conduit connected to the exhaust of the last named turbine, another of said turbines having an inlet connected to the cross-over conduit for receiving exhaust from the first named turbine, means for conducting gases from the combustion chamber into said conduit to reheat the exhaust gases of the first named turbine, and means for regulating the flow of gases into said conduit in response to a condition of the gases in the inlet of the other turbine.

3. In a gas turbine power plant, the combination of a furnace comprising a combustion chamber and a mixing chamber receiving gases from the combustion chamber, means for supplying air into said chambers, a plurality of gas turbines, one of said turbines having an inlet connected to the mixing chamber, a cross-over conduit connected to the exhaust of the last named turbine, another of said turbines having an inlet connected to said cross-over conduit for receiving exhaust from the first named turbine, and means including a second conduit for conducting gases from the combustion chamber into the cross-over conduit to reheat the exhaust gases of the first named turbine, the second conduit including an ejector for converting the pressure energy of the combustion gases flowing therethrough into velocity energy within the cross-over conduit.

4. In a gas turbine power plant, the combination of a furnace comprising a combustion chamber and a mixing chamber receiving gases from the combustion chamber, means for supplying air to each of said chambers, means for controlling the flow of air into the mixing chamber in response to temperature changes of the gas-air mixture, a high pressure gas turbine connected to the mixing chamber, a low pressure turbine and a cross-over conduit connected to the exhaust of the first named turbine, and means for reheating the gases conducted from the high pressure into the low pressure turbine, said means comprising a conduit having one end connected to the combustion chamber and another end provided with a restriction projecting into the cross-over conduit whereby combustion gases are conducted into the cross-over conduit and their pressure energy is converted into velocity energy to increase the gas pressure in the low pressure turbine.

5. In a gas turbine power plant, the combination of a furnace comprising a combustion chamber and a mixing chamber receiving gases from the combustion chamber, means for supplying air to each of said chambers, a plurality of turbines connected in series to the mixing chamber, a cross-over conduit between each two of consecutive turbines, and means for reheating gases flowing through the cross-over conduits comprising a supply conduit for conducting gases from the combustion chamber into the cross-over conduits.

6. In a gas turbine power plant, the combination of a furnace comprising a combustion chamber and a mixing chamber receiving gases from the combustion chamber, means for supplying air to each of said chambers, a plurality of turbines connected in series to the mixing chamber, a cross-over conduit between each two of consecutive turbines, means for reheating gases flowing through the cross-over conduits comprising a supply conduit for conducting gases from the combustion chamber into the cross-over conduits, means for controlling the flow of gases through the supply conduit in response to a gas condition in one of the cross-over conduits, and a blower forming a part of the above mentioned air supply means coupled with one of said turbines.

7. In a gas turbine power plant, the combination of a furnace comprising a combustion chamber and a mixing chamber receiving gases from the combustion chamber, means for supplying air to each of said chambers, a turbine comprising a plurality of stages connected to the mixing chamber, means for reheating the gas flowing from a higher stage into a lower stage comprising a conduit for conducting gases directly from the combustion chamber into each of said stages, and means for individually and collectively controlling the flow of gases from the combustion chamber to the different stages.

8. In a gas turbine power plant, the combination of a furnace comprising a combustion chamber and a mixing chamber receiving gases from the combustion chamber, means for supplying compressed air to each of said chambers, a gas turbine having a plurality of stages, the first stage being connected to the mixing chamber, means for reheating the gases between consecutive stages comprising an inner conduit connected to the combustion chamber, an outer conduit concentrically arranged about the inner conduit, a plurality of webs between the conduits to define annular chambers, each chamber being connected with the outlet side of one stage and the inlet side of the following stage, and means for discharging combustion gases from the inner conduit into the outer conduit, comprising a valve for each annular chamber to control the flow of combustion gases to the lower stages of the turbine.

9. In a gas turbine power plant, the combination of a high pressure turbine, a low pressure turbine, a cross-over conduit between the exhaust of the high pressure turbine and the inlet of the low pressure turbine, means for injecting high pressure combustion gases into the cross-over conduit to reheat the exhaust gases of the high pressure turbine including a nozzle in the cross-over conduit for converting pressure energy of the combustion gases into velocity energy, and means in the cross-over conduit behind the nozzle as regards the direction of flow of gases for converting velocity energy of the mixture into pressure energy.

FREDERICK SAMUELSON.